(12) United States Patent
Vandenbergh

(10) Patent No.: US 7,341,863 B2
(45) Date of Patent: Mar. 11, 2008

(54) METHOD FOR THE DEGRADATION OF MTBE AND TBA

(75) Inventor: Peter A. Vandenbergh, Sarasota, FL (US)

(73) Assignee: Osprey Biotechnics, Inc., Sarasota, FL (US)

( * ) Notice: Subject to any disclaimer, the term of this patent is extended or adjusted under 35 U.S.C. 154(b) by 43 days.

(21) Appl. No.: 11/377,036

(22) Filed: Mar. 16, 2006

(65) Prior Publication Data

US 2007/0218539 A1   Sep. 20, 2007

(51) Int. Cl.
*A62D 3/02* (2007.01)
(52) U.S. Cl. .................. 435/262.5; 435/174; 435/176; 435/286.5; 435/286.7; 435/289.1; 435/394
(58) Field of Classification Search ............. 435/286.5, 435/286.7, 289.1, 174, 176, 394, 262.5
See application file for complete search history.

(56) References Cited

U.S. PATENT DOCUMENTS

| 4,910,143 | A | 3/1990 | Vandenbergh |
| 5,980,747 | A | 11/1999 | Vandenbergh et al. |

OTHER PUBLICATIONS

Steffan et al., Applied and Enviromental Microbiology, Nov. 1997, pp. 4216-4222.*

* cited by examiner

*Primary Examiner*—Elvis O. Price
(74) *Attorney, Agent, or Firm*—Ian C. McLeod

(57) ABSTRACT

A method for the degradation of methyl-tertiary-butyl-ether (MTBE) and tertiary-butanol (TBA) using a mixture of *Pseudomonas putida* is described. The method enables almost complete remediation of MTBE and TBA in situ in contaminated water and/or soil.

9 Claims, 1 Drawing Sheet

METHOD FOR THE DEGRADATION OF MTBE AND TBA

CROSS-REFERENCE TO RELATED APPLICATIONS

Not Applicable

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to a method for the degradation of methyl-tertiary-butyl-ether (MTBE) and tertiary-butanol (TBA) in contaminated soil and water together or separately using a mixture of *Pseudoinonas putida*. The method is performed in the environment.

(2) Description of the Related Art

U.S. Pat. No. 4,910,143 to Vandenbergh, which is incorporated by reference herein in its entirety, describes modified Pseudomonas strains which enable the degradation of aliphatic and aromatic hydrocarbons in general. There was no recognition of the degradation of MTBE or its degradation by-product TBA in the 1980's. MTBE as a gasoline oxygenation additive came much later in about 1992 to lower ozone and carbon monoxide emissions. MTBE from spilled gasoline has become a serious soil contaminant and travels long distances in soil because of a low affinity for soil organic matter. Also MTBE has a high affinity for water with a solubility of 43,000 mg/l which is 25 times greater than benzene. MTBE is very mobile in the environment and is located far in advance of the gasoline source in the environment. It is also very difficult to remediate when located. Typically a by-product of partial degradation, the tertiary-butanol is present with MTBE. The result is an environmental problem of major proportions whenever there is a gasoline spill.

OBJECTS

It is an object of the present invention to provide a method for the remediation of MTBE and its by-product TBA in soil or in water. Further, it is an object to provide a method which is relatively fast and very economical. These and other objects will become increasingly apparent by reference to the following description and the drawings.

SUMMARY OF THE INVENTION

The present invention relates to a method for the degradation of methyl-tertiary- butyl-ether (MTBE) and tert-butanol (TBA) in situ in the environment in the contaminated soil and water together or separately which comprises:

(a) adding an effective cell count of a mixture of *Pseudomonas putida* which degrade the MTBE and TBA in the contaminated soil over time so as to degrade the MTBE and TBA. Preferably the *Pseudomonas putida* are a mixture of *Pseudomonas putida* NRRL-B-18118 and NRRL-B-18117. Preferably the soil is contaminated with gasoline which is remediated along with the MTBE and TBA. Preferably a minimal medium is provided with the *Pseudomonas putida* which enables the *Pseudomonas putida* to degrade the MTBE and TBA. Preferably an oxygen source is provided in a minimal medium for the *Pseudomonas putida*. Preferably the cell count is between $10^6$ to $10^{12}$ CFU. Preferably the *Pseudomonas putida* are added sequentially over a period of days until the MTBE and TBA are degraded. Preferably the soil and water is in the environment which is at a gasoline delivery site. Preferably the cell count ratio of NRRL-B-18117 and NRRL-B-18118 is between about 1 to 10 and 10 to 1.

The substance and advantages of the present invention will become increasingly apparent by reference to the following drawings and the description.

DESCRIPTION OF THE PREFERRED EMBODIMENTS

EXAMPLE 1

Figure 1:
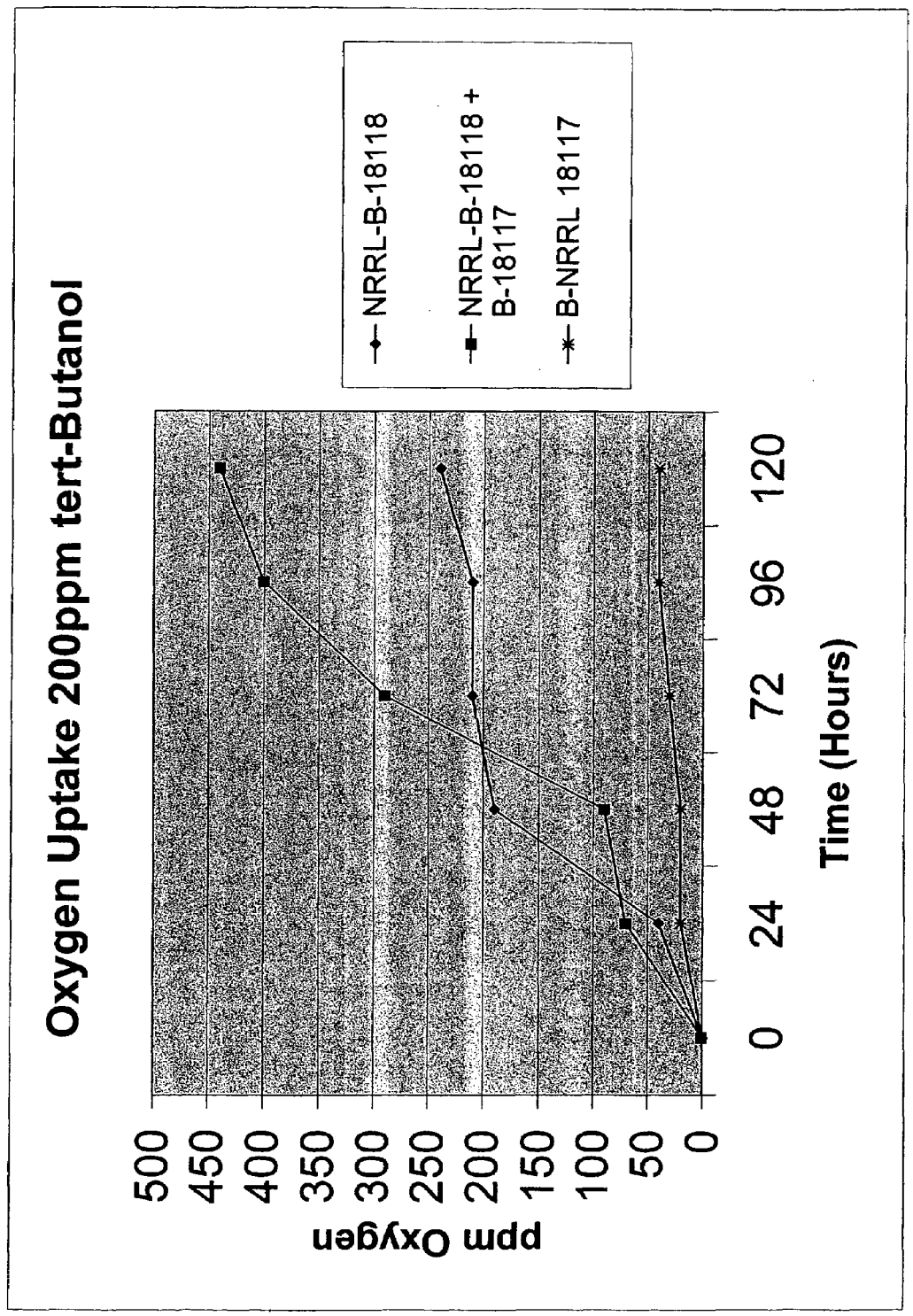
FIG. 1 is a graph showing oxygen uptake during degradation of TBA by single strains and mixed strains. The mixed strains were much more effective in degrading TBA.

*Pseudomonas putida* NRRL-B-18118 and NRRL-B-18117 were produced in an aqueous minimal medium as set forth in U.S. Pat. No. 5,980,747 to Vandenbergh et al, incorporated herein in its entirety, which provides active bacteria to be provided to the remediation site from a manufacturing facility.

EXAMPLE 2

This Example demonstrates the effective remediation of TBA, the MTBE by-product.

Tertiary butanol (TBA), the breakdown product of MTBE was degraded in minimal medium (Example 1) that was supplemented with 200 ppm TBA. Oxygen uptake was measured using a HACH model 2173 B (Loveland, Colo.) respirometer. Oxygen uptake is a measurement of substrate consumption, in this example TBA. It was found that both strains synergistically degrade more TBA than each strain individually.

| | $O_2$ Uptake (ppm) 200 ppm tertiary Butanol | | | | | |
|---|---|---|---|---|---|---|
| | Time (hours) | | | | | |
| Strains | 0 | 24 | 48 | 72 | 96 | 120 |
| NRRL-B-18118 | 0 | 40 | 190 | 210 | 210 | 240 |
| NRRL-B-18117 | 0 | 20 | 20 | 30 | 40 | 40 |
| NRRL-B-18118 NRRL-B-18117 | 0 | 73 | 90 | 290 | 400 | 440 |

It is intended that the foregoing description be only illustrative of the present invention and that the present invention be limited only by the hereinafter appended claims.

I claim:

1. A method for the degradation of methyl-tertiary-butyl-ether (MTBE) and tert-butanol (TBA) in situ in the environment in the contaminated soil and water together or separately which comprises:
   (a) adding an effective cell count of a mixture of *Pseudomonas putida* selected from the group consisting of *Pseudomonas putida* NRRL-B-18117, NRRL-B-18118 and mixtures thereof which degrade the MTBE and TBA in the contaminated soil over time so as to degrade the MTBE and TBA.

2. The method of claim 1 wherein the *Pseudomonas putida* are a mixture of *Pseudomonas putida* NRRLB-18118 and NRRL-B-18117.

3. The method of claims 1 or 2 wherein the soil is contaminated with gasoline which is remediated along with the MTBE and TBA.

4. The method of claims 1 or 2 wherein a minimal medium is provided with the *Pseudomonas putida* which enables the *Pseudomonas putida* to degrade the MTBE and TBA.

5. The method of claims 1 or 2 wherein an oxygen source is provided in a minimal medium for the *Pseudomonas putida*.

6. The method of claims 1 or 2 wherein the cell count is between $10^6$ to $10^{12}$ CFU.

7. The method of claims 1 or 2 wherein the *Pseudomonas putida* are added sequentially over a period of days until the MTBE and TBA are degraded.

8. The method of claims 1 or 2 wherein the soil and water is in the environment which is at a gasoline delivery site.

9. The method of claims 1 or 2 wherein the cell count ratio of NRRL-B-18117 and NRRL-B-18118 is between about 1 to 10 and 10 to 1.

* * * * *